United States Patent
Serebryanov et al.

(10) Patent No.: US 7,030,387 B2
(45) Date of Patent: Apr. 18, 2006

(54) CONTINUOUS MOISTURE GETTER FOR SOLID STATE DETECTOR

(75) Inventors: Oleg Serebryanov, San Jose, CA (US); Michael Petrillo, Pleasanton, CA (US); Sorin Cora, Anaheim, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/274,190

(22) Filed: Oct. 18, 2002

(65) Prior Publication Data

US 2004/0075059 A1 Apr. 22, 2004

(51) Int. Cl.
G01T 1/24 (2006.01)
G01N 23/00 (2006.01)

(52) U.S. Cl. .................... 250/370.15; 378/19

(58) Field of Classification Search ........... 250/370.15, 250/370.1, 443.1, 252.1, 341.5; 65/51.1; 62/3.2, 91, 51.1; 378/19, 20

See application file for complete search history.

(56) References Cited

U.S. PATENT DOCUMENTS

| | | | |
|---|---|---|---|
| 4,006,260 A * | 2/1977 | Webb et al. ................ | 426/438 |
| 4,886,240 A | 12/1989 | Rich | |
| 5,235,817 A | 8/1993 | Gallagher | |
| 5,274,237 A | 12/1993 | Gallagher | |
| 5,485,005 A | 1/1996 | Aikens | |
| 5,553,113 A * | 9/1996 | Weedon ..................... | 378/98.5 |
| 5,773,829 A | 6/1998 | Iwanczyk et al. | |
| 5,816,052 A * | 10/1998 | Foote et al. ................. | 62/51.1 |
| 5,982,843 A | 11/1999 | Bailey et al. | |
| 6,064,715 A | 5/2000 | Sklebitz et al. | |
| 6,089,237 A * | 7/2000 | Podolak et al. ............ | 131/303 |
| 6,285,028 B1 | 9/2001 | Yamakawa | |

(Continued)

FOREIGN PATENT DOCUMENTS

DE 3434890 A1 4/1986

(Continued)

*Primary Examiner*—Otilia Gabor
(74) *Attorney, Agent, or Firm*—Douglas B. McKnight

(57) ABSTRACT

A nuclear camera system (10) includes a gantry (22, 23) disposed about an examination region (17) having detector heads (15 a,b,c) mounted to the gantry. The detector heads (15) include an enclosure (30, 34, 54, 56) defining a volume (61). A plurality of solid state detectors (40) are arranged in an array (36) within the enclosure volume. A first cold plate (46) is in thermally conductive contact with the plurality of solid state detectors. A first Peltier cooler (50) is in thermally conductive contact with the first cold plate, the first Peltier cooler provides for cooling the plurality of detectors in the array. A second cold plate (47) is located within the enclosure and is thermally insulated from first cold plate. A second Peltier cooler (52) is in thermally conductive contact with the second cold plate, the second Peltier cooler for removing moisture from the volume (61). A heat sink (56) is in thermally conductive contact with the first and second Peltier coolers. A sensor (64, 66, 68, 75) is in operative relationship with the detector head. The sensor (75) provides a signal indicative of an environmental condition within the interior volume of the detector head. A controller (24) is controllably connected to the sensor. The controller determines a modification, modification in response to the sensor signal, to a selected environmental condition within the interior volume of the detector head and provides a control instruction for the modification. An actuator (52, 66, 73) is in operative relationship with the interior volume of the detector and is controllably connected to the controller. The actuator implements a control instruction from the controller for modifying the selected condition within the detector head.

5 Claims, 6 Drawing Sheets

U.S. PATENT DOCUMENTS 6,418,728 B1 * 7/2002 Monroe .................. 62/3.2
6,459,757 B1 * 10/2002 Lacey .................... 378/19
6,800,114 B1 * 10/2004 Vanderhoof et al. ...... 95/117

FOREIGN PATENT DOCUMENTS

EP     0 943 931     9/1999

* cited by examiner

CONTINUOUS MOISTURE GETTER FOR SOLID STATE DETECTOR

BACKGROUND

The present invention relates to cooling of solid state detectors in nuclear cameras and is particularly related to an apparatus that is adapted to cool the detectors and remove moisture. The present invention finds application in conjunction with nuclear medical diagnostic imaging systems and will be described with particular respect thereto.

Gamma cameras, also referred to as nuclear cameras, are often used to measure gamma radiation emitted by a body under examination. By measuring the energy and the location of the gamma ray emissions, an image representative of the gamma radiation emitted from the body under examination can be created. Gamma rays are produced by virtue of introducing one or more radionuclidies into a region of interest within a patient. These radionuclidies decay, thereby emitting gamma radiation characterized by photons having one or more characteristic energies.

Nuclear gamma cameras typically include one or more detector heads which receive the gamma radiation emanating from a patient. Many present design detector heads typically included a scintillation crystal which converts incident radiation to flashes of light. For a detector assembly utilizing the scintillation crystal, an array of photomultiplier tubes detects each scintillation event. The photomultiplier tubes are connected with position determining circuitry to ascertain the location of each received radiation event or scintillation, its energy, and other characteristics and produce the output signal which is indicative thereof. A collimator situated in front of the scintillation crystal is used to limit the field of view of the radiation detector and defines the detector's overall resolution and sensitivity (or efficiency). Typically, the detector head is housed in a radiation blocking material, such as a lead housing. The nuclear camera detector may be a planar nuclear gamma ray detector or a Single Photon Emission Computed Tomography (SPECT) system.

Recent development of the nuclear camera head includes a detector assembly which may be comprised of solid state detector (SSD) crystals of, for example, cadmium zinc telluride (CZT) or other suitable solid state devices or materials to directly provide electrical signals in response to detected radiation that are useful for generating diagnostic images. The solid state detector crystal array is connected with position determining circuitry to ascertain the location of each received radiation event, its energy, and other characteristics and produce the output signal which is indicative thereof.

It is known that cooling solid state detectors improves the system performance and reliability. However, cooling the systems below the dew point, particularly the dew point within the volume of the enclosed camera head, has been problematic. Cooling the CZT detectors below the dew point can allow moisture to condense on the crystals or other sensitive components within the detector head. This moisture creates a number of problems regarding performance and reliability. Cooling the detector components with forced air introduces dust and other contaminants while increasing the noise of the system.

Each detector head is connected to a gantry systems which rotates the detector head about a subject to obtain a complete data set. Rotation of a single detector head 360 degrees about a subject produces a complete data set. To reduce imaging time gamma cameras often contain two or more detector heads coupled to a single gantry system.

It is desirable to have a solid stated detector system that can be cooled to improve its performance and not compromise reliability due moisture to moisture and environmental conditions within the detector head. It is also desirable to cool the detector assembly without introducing dust or other contaminants into the system. Another desired feature it to reduce noise for the patient being imaged while providing cooling to the solid state detector system.

SUMMARY OF THE INVENTION

The present invention is directed to a nuclear camera detector head that satisfies the need to provide a cooled solid state detector assembly which is cooled without deleterious effects described above. An apparatus in accordance with one embodiment of the present invention includes detector heads having an enclosure defining a volume. A plurality of solid state detectors are arranged in an array within the enclosure volume. A first cold plate is in thermally conductive contact with the plurality of solid state detectors. A first Peltire cooler is in thermally conductive contact with the first cold plate, the first Peltier cooler provides for cooling the plurality of detectors in the array. A second cold plate is located within the enclosure and is thermally insulated from first cold plate. A second Peltier cooler is in thermally conductive contact with the second cold plate, the second Peltier cooler for removing moisture from the volume. A heat sink is in thermally conductive contact with the first and second Peltier coolers.

A method of controlling environmental conditions within a solid state nuclear camera detector head in accordance with principles of the present invention includes providing sensor signals indicative of the environmental conditions within a volume of the detector head and determining environmental conditions within the volume of the detector head from the sensor signals. The method includes determining desired environmental conditions within the detector volume and comparing the determined environmental conditions with the desired environmental conditions and generating a signal indicative of the comparison. A selected environmental condition to be modified is determined in response to the comparison signal. The selected environmental condition is modified in the volume of the detector head.

A nuclear camera system implementing principles of the present invention includes a gantry disposed about an examination region having detector heads mounted to the gantry. The detector heads include an enclosure defining a volume. A plurality of solid state detectors are arranged in an array within the enclosure volume. A first cold plate is in thermally conductive contact with the plurality of solid state detectors. A first Peltire cooler is in thermally conductive contact with the first cold plate, the first Peltier cooler provides for cooling the plurality of detectors in the array. A second cold plate is located within the enclosure and is thermally insulated from first cold plate. A second Peltier cooler is in thermally conductive contact with the second cold plate, the second Peltier cooler for removing moisture from the volume. A heat sink is in thermally conductive contact with the first and second Peltier coolers. A sensor is in operative relationship with the detector head. The sensor provides a signal indicative of an environmental condition within the interior volume of the detector head. A controller is controllably connected to the sensor. The controller determines a modification, modification in response to the sensor signal, to a selected environmental condition within the interior volume of the detector head and provides a control instruction for the modification. An actuator is in operative relationship with the interior volume of the detector and is controllably connected to the controller. The actuator implements a control instruction from the controller for modifying the selected condition within the detector head.

An apparatus and method applying principles of the present invention provides the foregoing and other features hereinafter described and particularly pointed out in the claims. The following description and accompanying drawings set forth certain illustrative embodiments applying principles of the present invention. It is to be appreciated that different embodiments applying principles of the invention may take form in various components and arrangements of components. These described embodiments being indicative of but a few of the various ways in which the principles of the invention may be employed. The drawings are only for the purpose of illustrating a preferred embodiment of an apparatus applying principles of the present invention and are not to be construed as limiting the invention.

BRIEF DESCRIPTION OF THE DRAWINGS

The foregoing and other features and advantages of the present invention will become apparent to those skilled in the art to which the present invention relates upon consideration of the following detailed description of a preferred embodiment of the invention with reference to the accompanying drawings, wherein.

DETAILED DESCRIPTION

Figure 1:
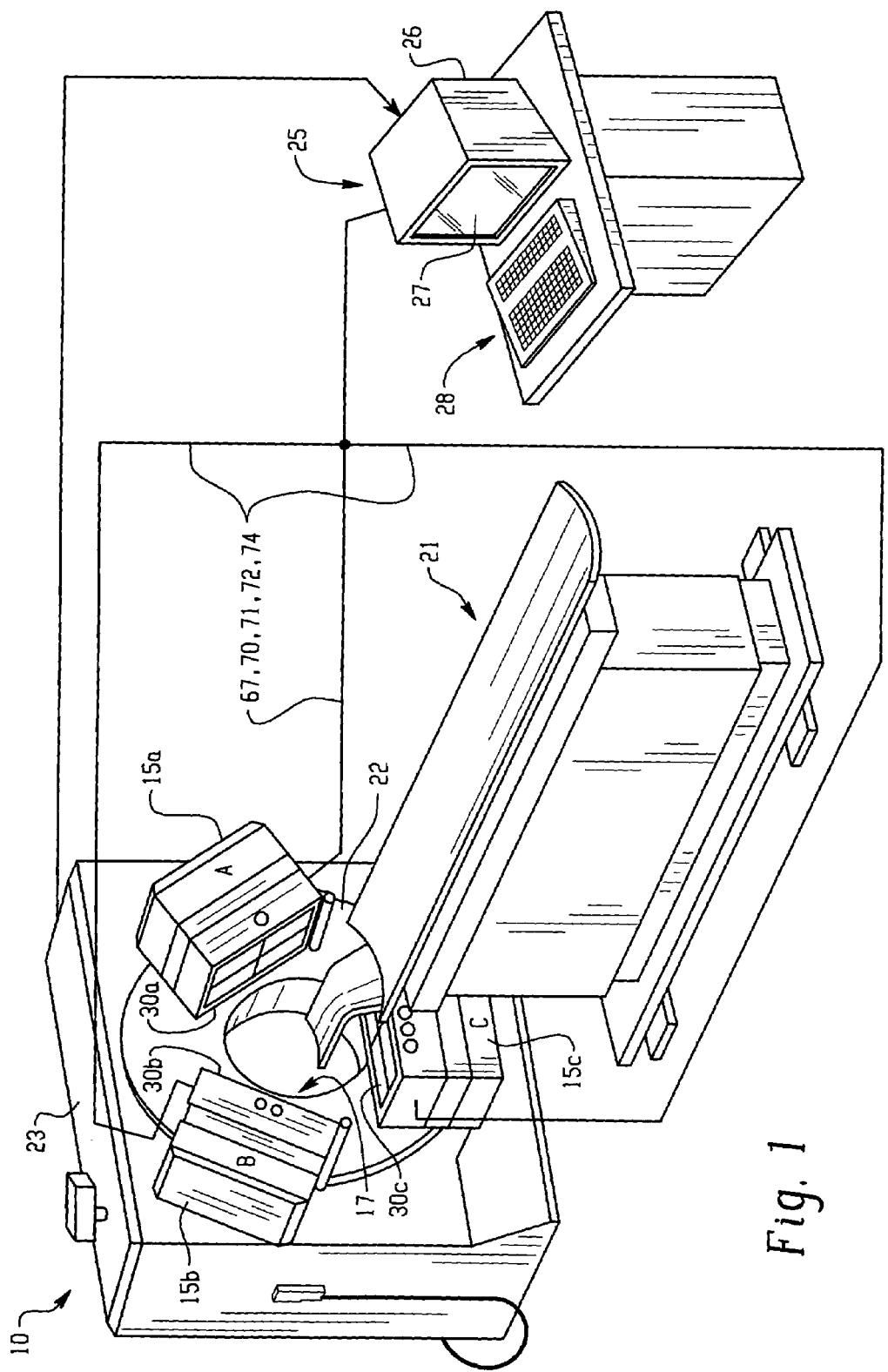
FIG. 1 is a perspective and schematic representation of a nuclear camera system in accord with principles of the present invention.

With reference to FIG. 1, a gamma camera system 10 is shown having a plurality of radiation detector heads 15a, 15b, 15c (collectively referred to as detector head 15) disposed around a subject examination region 17. It will be appreciated, however, that each detector head 15 may be configured to move relative to one another in accordance with known techniques in the art such that, for example, detector head 15a may be positioned opposite detector head 15b or be positioned at any angle ranging from 90–180 degrees with respect to detector head 15b. A patient couch or other subject support 21 selectively supports a region of interest of a subject or object to be examined in the examination region 17.

The detector heads 15 are mounted to a rotatable gantry portion 22 which is connected to a suitable motor and bearing assembly (not shown) supported by a stationary gantry portion 23. The rotatable gantry portion 22 functions to rotate or index the detector heads 15 around the examination region. Also mounted to the rotating gantry portion 22 are a plurality of mechanical drives (not shown) for moving each of the gamma camera heads 15 independently radially toward and away from the examination region 17 and tangentially to the left and right of the examination region 17. The gamma camera heads 15 may be mounted on roller carriages or slide bars for smoother, easier movement. It is to be appreciated that any of the known detector positioning or gantry positioning mechanisms for locating detectors around a region of interest of a subject to be imaged may be used with detectors according to principles of the present invention.

Movement of the gantry portion 22 and operation of the detector heads 15 are controlled by an operator through operator interface 25. More specifically, the operator interface 25 couples to the gamma camera system 10 through gamma camera control processor 24 (see FIG. 3). The gamma camera control processor 24 serves to control rotational and directional movement of the gantry portion 22 and detector heads 15 as well as the on/off state of the detector heads 15. Image processing/reconstruction and system control function 27 in a control console 26 processes the output signals of the camera heads 15 as they provide signals during an examination into an image representation. The image representation may be displayed on a video monitor 27, stored in computer memory, stored on tape or disk for later recall, further processed, or the like. The imaging system control console 26 coordinates the operation of the gamma camera system 10. All of the control and imaging processing functions in the illustrated components and systems can be performed by known computer based systems having an operable complement of component systems such as suitable processors 24, memory and storage, input, output and data communications capabilities.

The operator interface 25 includes the operator control console 26 and the video monitor 27 for providing a human readable display of selected portions of information obtained by the detector heads 15. A keyboard 28 enables the operator to control, for example, the image reconstruction process, the selection of displayed data, the selection of scanning procedures, and other custom operations as more particularly described below.

Figure 2:
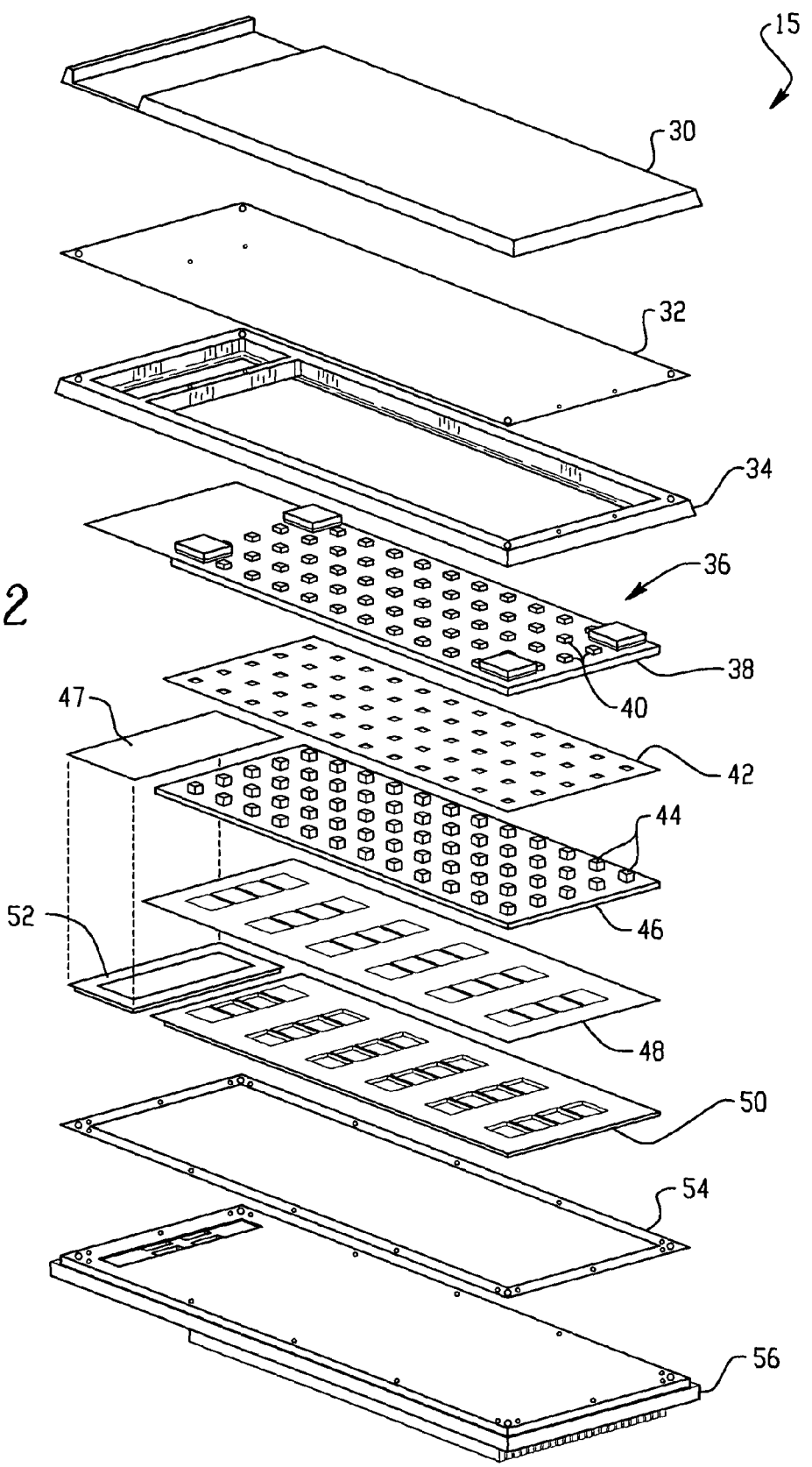
FIG. 2 is an exploded perspective view of a nuclear detector assembly in accordance with principles of the present invention.

Referring now to FIGS. 1 and 2, the detector head 15 is discussed in more detail. Each detector head 15a, 15b, 15c of the present invention is operatively connected to the control console 26 and includes a cover 30 and a foil seal 32 to insulate the detector interior components from the external environment, as well as to provide a seal for holding the interior volume of the detector 15 under vacuum. A detector frame 34 encloses the top portion of the detector assembly and retains the elements of the detector securely within the detector head. A detector array 36 includes a carrier board 38 and plurality of CZT Solid State Detector elements 40 operatively connected to provide suitable signals indicative of received radiation to the imaging system. It is to be appreciated that solid state detector elements comprised of other suitable materials may be substituted in the detector array 36.

A cold gasket 42 insulates and directs heat transfer to a plurality of thermally conductive cold plate fingers 44 located on a cold plate 46. The cold fingers 44 and cold plate 46 are in thermally conductive contact with, and draw heat from, respective SSD detector elements 40. A thermally conductive second cold plate 47 is exposed to the interior volume or atmosphere of the detector and is thermally separated or insulated from the cold plate 46. An insulating hot gasket 48 prevents heat feedback from below the gasket back into the cold plate 46 and subsequently into the detector array 36.

A SSD cooler Peltier thermoelectric module 50 is placed in a suitable thermally conductive contact with the cold plate 46 using known seating methods to assure proper thermoelectric coupling between the Peltier board 50 and the cold plate 46. A moisture getter Peltier thermoelectric module 52 is placed in a suitable thermally conductive contact with the second cold plate 47 using known seating methods to assure proper thermoelectric coupling between the Peltier board 52 and the second cold plate 47. A closing gasket 54 is placed around the perimeter of the detector frame 34 such that upon assembly of the components the detector enclosure 15 will be able to be placed under and maintain a desired vacuum level during detector operation.

A hot plate 56, a heat sink and radiation shield comprised of copper, is placed in a suitable thermally conductive contact with the first Peltier board 50 and second Peltier board 52 using known seating methods to assure proper thermoelectric coupling between the Peltier boards 50, 52 and the hot plate 56. The copper hot plate 56 stabilizes the cooling system for the detector head 15.

Figure 3:
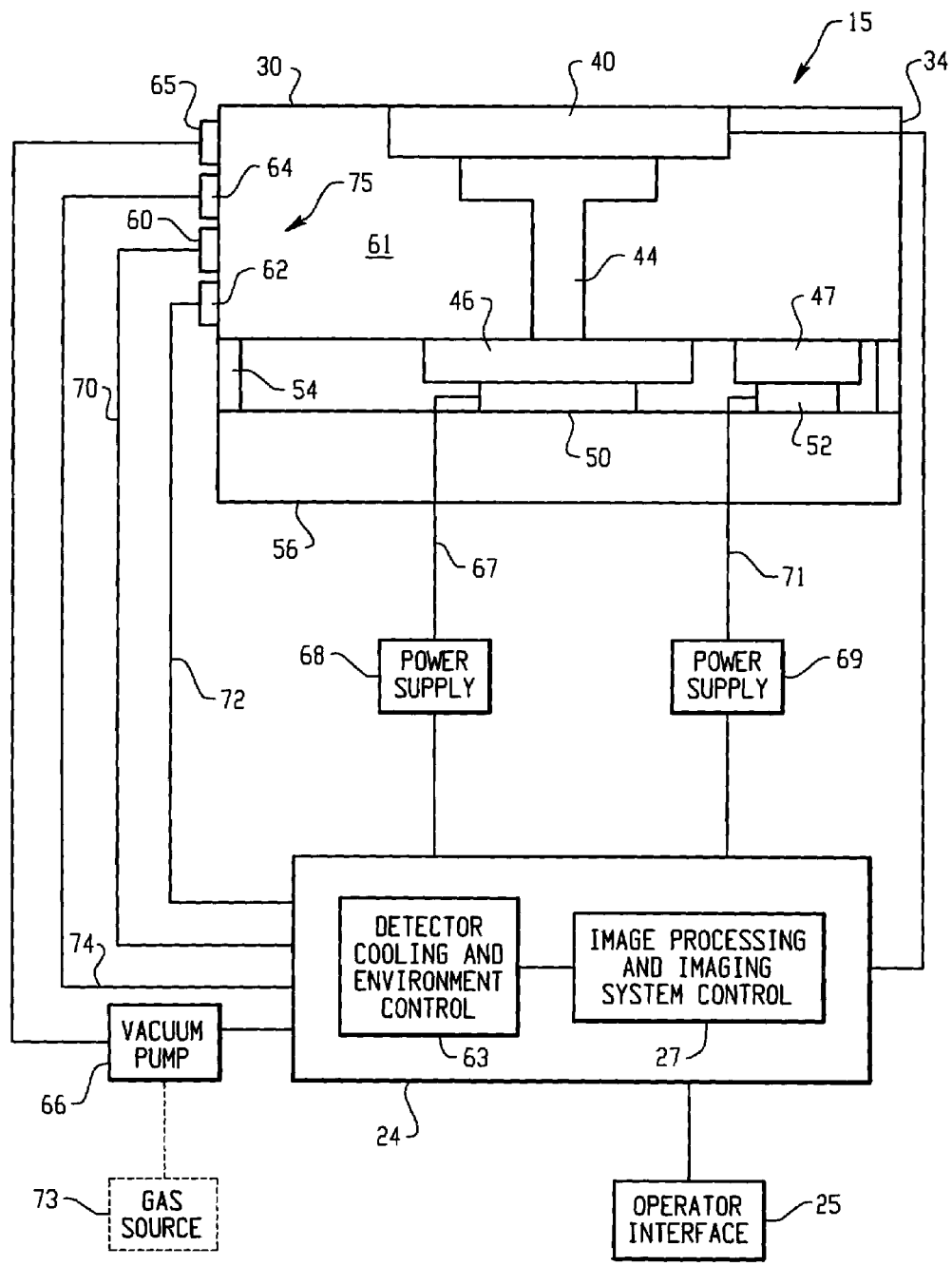
FIG. 3 is a schematic representation of a detector used according to principles of the present invention.

Turning now to FIG. 3 a block schematic representation shows additional features used in application of principles of the present invention. The detector 15 includes a temperature sensor 60 which is operatively connected to the detector and the control processor 24 via a line of data communication 70. The sensor 60 provides signals indicative of the temperature of the internal volume 61 of the detector head 15 to a detector cooling and environmental control function 63 in the control processor 24. A moisture sensor 62 is operatively connected via a line of data communication 72 to provide signals indicative of the moisture content or humidity of the atmosphere within the internal volume 61 to the detector cooling and environmental control function 63. A pressure sensor 64 is operatively connected via a line of data communication 74 to provide signals indicative of the gas or atmospheric pressure within the internal volume 61 to the detector cooling and environmental control function 63. The sensors 60, 62, 64 are collectively referred to as environmental sensors 75.

A vacuum pump 66 controllably connected to the control processor 24 is also operatively connected to the detector volume 61 through the detector frame 34. A suitable control valve 65 interconnects the pump with the volume 61 such that a desired level of vacuum may be drawn within the detector 15 by actuating the vacuum pump 66. Alternatively, the vacuum pump 66 and valve 65 may be operable to be used to introduce a suitable gas or air from a gas source 73 into the volume 61, e.g. dry air or a moisture free gas. The gas source 73 may be from a gas storage system or provided form a de-humidifier system that removes moisture from ambient air. One mode of such operation may include drawing a vacuum and subsequently providing gas from the gas source 73 to allow the pressure in the volume to return to a desired pressure above that drawn with the pump 66. Other combinations of vacuum and replaced air or gas are contemplated such that the result is to have an environmental condition within the volume 61 that cooling of the detectors 40 will not result in moisture problems associated with humidity and/or dew point.

A power supply 68 is controllably connected to the control processor 24 to provide suitable power through a supply line 67 to the SSD cooling Peltier cooler 50. A power supply 70 is controllably connected to the control processor 24 to provide suitable power through a supply line 69 to the moisture getter Peltier cooler 52. The solid state detector is operatively connected to the control processor 24 and image processing control 27. It is to be appreciated that only a single detector 40 is illustrated for simplicity of description and the principles of the invention apply to the detector array 36 as shown in FIG. 2.

Figure 4:
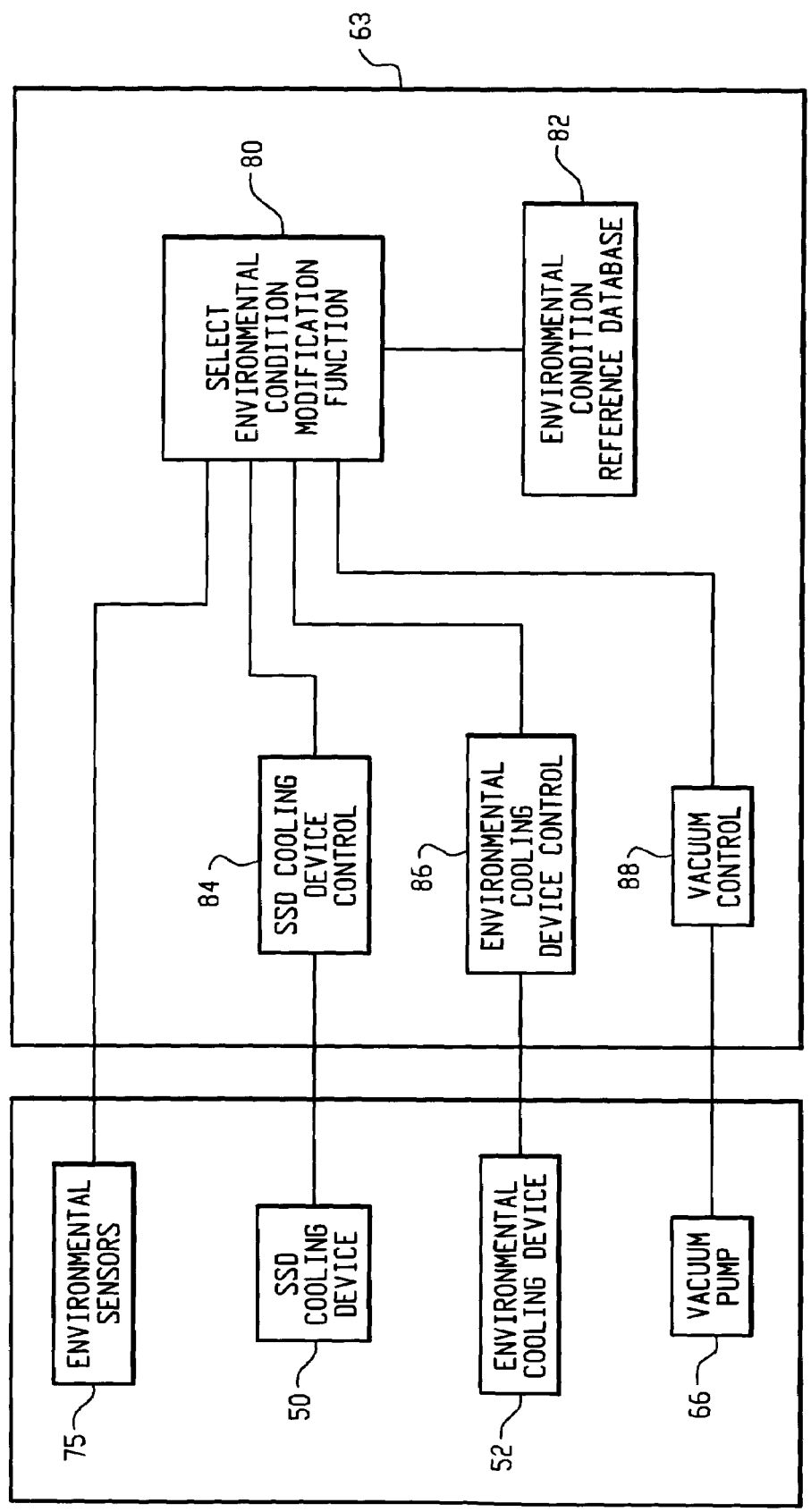
FIG. 4 is a schematic block diagram of a control function in accordance with principles of the present invention.

Referring now to FIG. 4, the detector cooling and environmental control function 63 of the control processor 24 will be further described. The environmental sensors 75 are in data communication with a select environmental condition modification function 80. The environmental condition modification function 80 makes a determination of desired environmental conditions within the detector that are useful to obtain a desired detector temperature and cooling for a desired level of detector performance without negative consequences due to moisture as described above. Control signals to adjust the detector environmental conditions are provided from the environmental condition modification function 80 to various controllers as described below.

The environmental condition modification function 80 is in data communication with an environmental condition reference database 82. The database 82 may include tables showing, for example and not limitation of the scope of the present invention; selected values and relationships between: the temperature of the volume 61, temperature of the detector crystals 40, temperature of the detector cooling Peltier board 50, temperature of the moisture getter Peltier board 52, humidity or moisture content in the volume 61, atmospheric pressure (or vacuum) of the volume 61, dew point within the volume 61, a desired moisture level within the volume and a desired pressure within the volume. Alternatively, algorithms may be substituted for tabular data. The tables or data may be empirically determined or from known relationships for pressure, temperature, moisture content and dew point. Relative sensor data may be indicative of conditions within the volume while not measuring the actual conditions. Relationships between actual environmental conditions within the detector and the sensor measured conditions (whether within or outside the detector) may be empirically developed or approximated for desired information to provide suitable control signals to operate the detector system according to principles of the present invention.

The environmental condition modification function 80 is in data communication with (i) a Solid State Detector cooling device control 50 that is controllably connected to actuate the SSD cooling Peltier cooler 50 via the power supply 68, (ii) an environmental cooling device control 86 that is controllably connected to actuate the environmental cooling Peltier device 52 via the power supply 69 and (iii) a vacuum control 88 that is controllably connected to actuate the vacuum pump 66, valve 65 and/or gas source 73.

Figure 5:
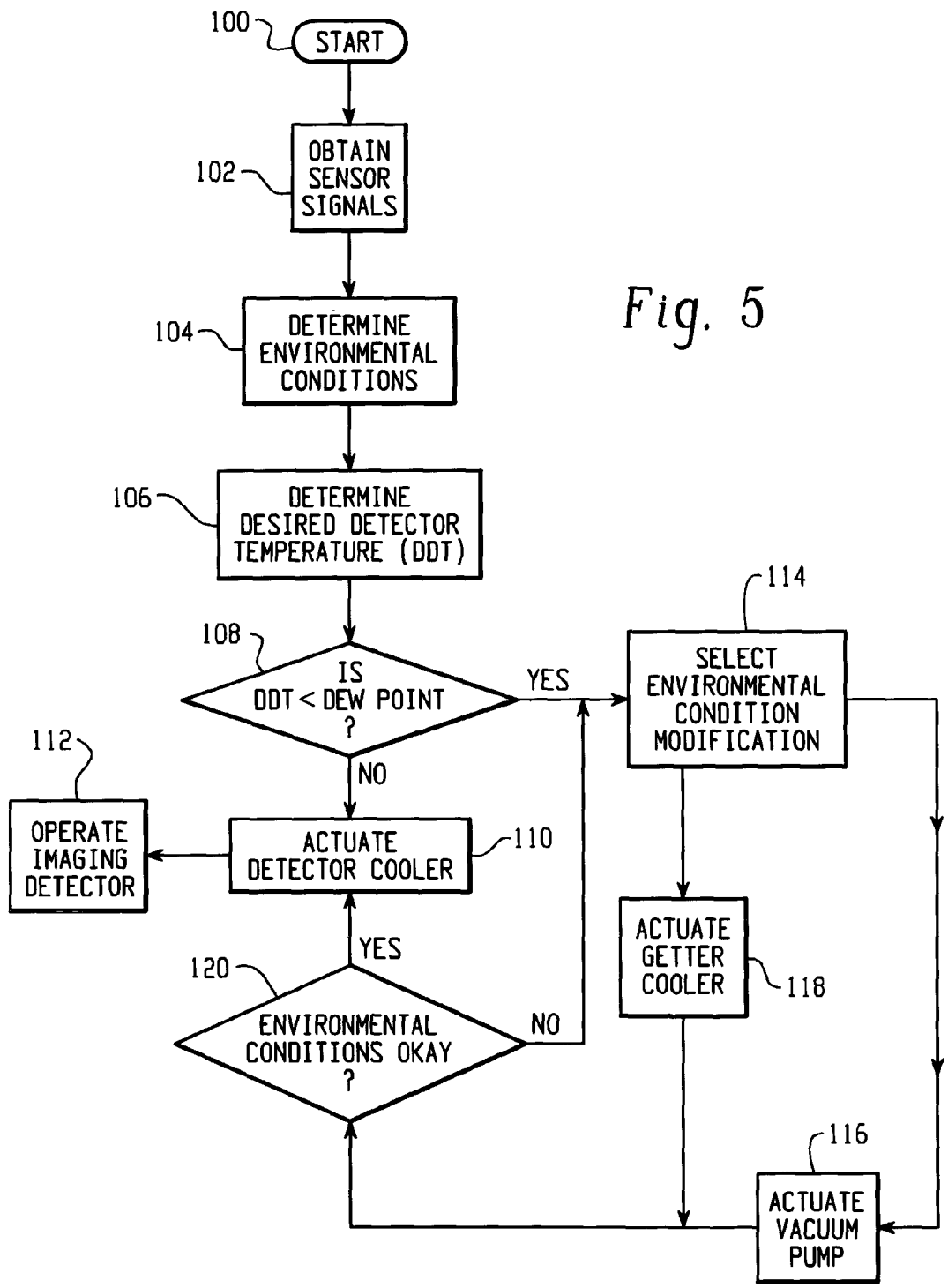
FIG. 5 is a flow diagram illustrating a process which may be used in a nuclear camera system in accordance with principles of the present invention.

Turning now to FIG. 5, one example of a process is shown that is carried out in the control processor 24 illustrating the operation of a nuclear camera system 10 in accordance with principles of the present invention. The process starts at step 100 where initial system parameters are set and any desired calibration steps are performed. The process then proceeds to step 102 where sensor signals are obtained from the temperature sensor 60, the moisture sensor 62 and pressure sensor 64. The sensor signals indicative of the environmental conditions within the detector volume 61 are provided to the environmental condition modification function 80. Next, in step 104, the environmental condition modification function 80 refers to the environmental conditions reference database 82 to obtain reference information to apply to the received sensor signals to determine the present conditions within the detector, for example, the dew point. In step 106, the environmental condition modification function 80 determines the cooling required to operate the solid state detectors at a desired performance level. Proceeding to step 108 a determination is made in the environmental determination modification function as to whether the amount of cooling as determined in step 106 will likely result in cooling components for the detectors operating at a temperature than the determined dew point within the volume 61. If the determination is negative, for example the cold plate 46 and detector cooling Peltier board 50 will operate at a temperature above the dew point and not have moisture condense on them, the process advances to step 110 where the SSD control device 84 is instructed to actuate the SSD Peltier cooling device 50 and cool the detectors 40 to the desired operating temperature. The environmental control process then advances to terminate at step 112 where the nuclear camera detector is operated to generate an image.

If the determination in step 108 is affirmative, that the cold plate 46 and detector cooling Peltier board 50 will operate at a temperature that will likely result in cooling components for the detectors operating at a temperature lower than the determined dew point within the volume 61 and may have moisture condense on them, the process moves to step 114 where a selection is made in the environmental condition modification function 80 as to which device or combination of devices will be implemented to establish the desired environmental conditions for the selected detector operating temperature. Upon determining the desired environmental conditions, in response to the signals provided by the environmental sensors indicating current conditions and the environmental condition reference database 82, the modification function provides appropriate control signals at the proper time to the selected device controller 84, 86, 88. For example, for sensed environmental conditions and a desired detector cooling level, deleterious effects of moisture may be addressed by drawing a particular level of vacuum in the detector assembly, as per data in the reference database 82, thereby removing sufficient moisture from the internal environment. If this is the selected apparatus and method to obtain the desired environmental conditions, the process increments to step 116 where the desired vacuum level is achieved by providing a command from the modification function 80 to the vacuum control 88 until the pressure sensor 64 confirms the selected vacuum level. Removing a volume of the atmosphere may remove sufficient moisture to reduce the threshold for deleterious effects of moisture on the detector cooling components. Alternatively, the vacuum control may issue a control command to the gas source 73 and vacuum pump 66 to replace some of the gas within the detector head to reduce moisture. It is also possible to draw a desired level of vacuum in addition to supplying a drier air or other suitable gas. Once the control command has been executed according to the modification function 80 instruction, the sensor 75 signals are used in step 120 to determine whether environmental conditions are now acceptable for detector cooling. If the determination is affirmative, that conditions are acceptable, the process goes to step 110 to actuate the SSD cooling Peltier device 50 and then environmental control process terminates at step 112 where the nuclear camera detector is operated to generate an image.

Alternatively, at step 114 depending on the desired modification of environmental conditions to be determined in the environmental condition modification function 80, the conditions in the detector may be modified by actuating the getter cooling Peltier device 52 to a temperature below, for example the dew point such that moisture either condenses on the cooling plate 47 or freezes on the plate 47. The selected temperature is selected such that moisture is attracted to the plate 47 and is less likely to cause deleterious moisture effects on the components of the system used for cooling the detectors 40. Once the control command has been executed according to the modification function 80 instruction, the sensor 75 signals are used, in step 120, to determine whether environmental conditions are now acceptable for detector cooling. If the determination is affirmative, that conditions are acceptable, the process goes to step 110 to actuate the SSD cooling Peltier device 50 and then environmental control process terminates at step 112 where the nuclear camera detector is operated to generate an image. It is to be appreciated that the environmental condition modification function 80 may select to implement any aspects of steps 116 and 118 is any desired combination to achieve the desired environmental conditions within the detector head while cooling the solid State Detector crystals 40.

Figure 6:
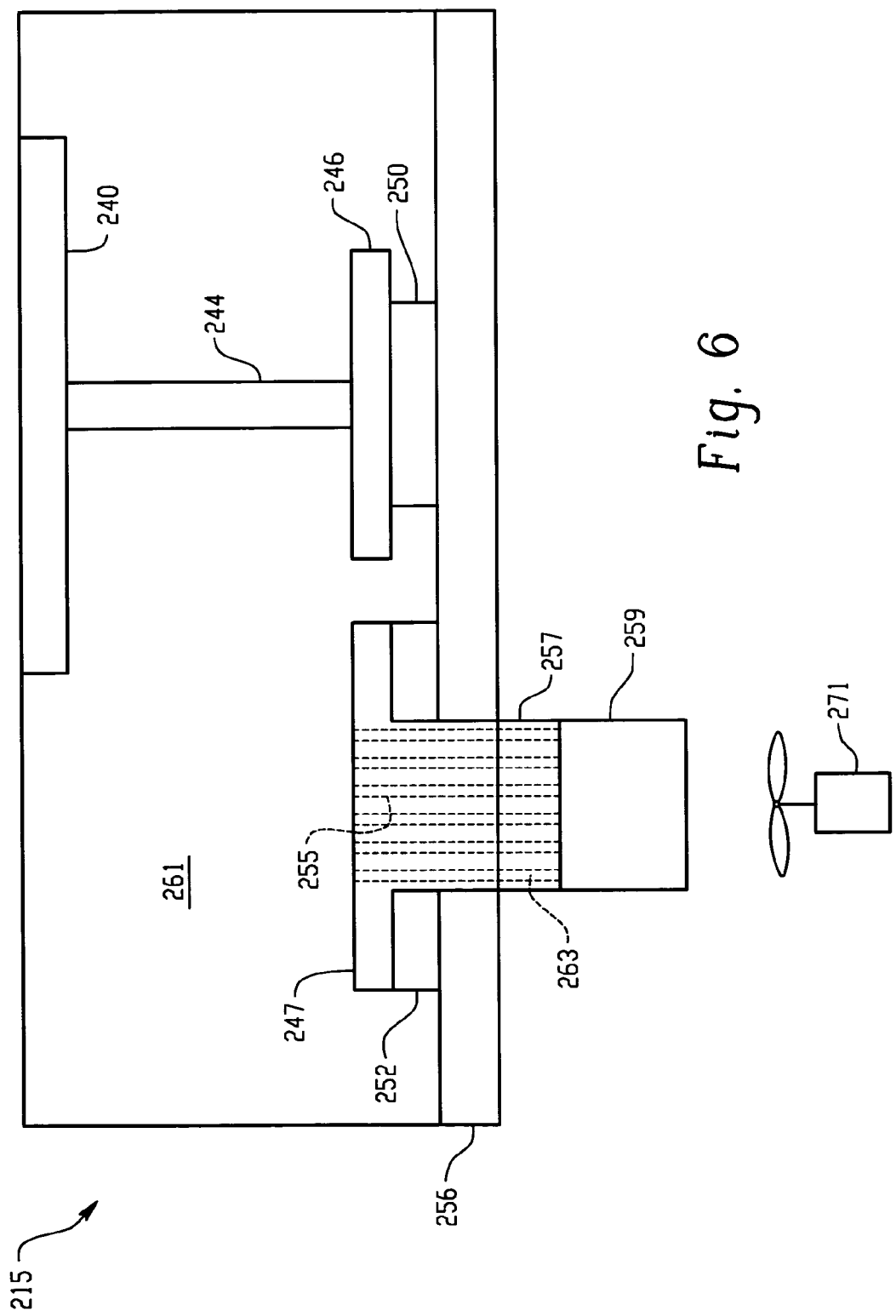
FIG. 6 is a schematic representation of another detector for use according to principles of the present invention.

Turning to FIG. 6, another detector head 215 illustrates another apparatus for removing moisture from the air in a detector volume 261. The principles discussed above in the selection of materials, assembly functions and features apply to the components described for this embodiment. A solid state detector 240 is in contact with a cold finger 244 and cold plate 246. A detector cooler Peltier device 250 is suitably in contact with the cooling plate 246 and heat sink hot plate 256. A getter cooler plate 247 has capillary bored conduits extending through from an inner surface of the plate to an outer surface. Getter Peltier coolers 252 are in thermally operative contact with the plate 247 and the hot plate 256. Adjacent to the plate 247 is a moisture conducting member 257 comprised of insulating plastic or metal. The member 257 has corresponding capillary bores 263 that match up with the bores 255 in the cold plate 247. A fibrous member 259 is in suitable contact with the member 257 and its capillary bores 263 to provide absorptive function to collect the moisture that transits through the cold plate 247, member 257 by capillary action. A fan 271 may be used to improve the evaporation of moisture from the fiber member and assist in further absorption of moisture from the getter cold plate 247. It is to be appreciated that such an embodiment may be suitably controllably connected to the detector cooling and environment control such that it may be implemented in a step in the control process of FIG. 4.

The invention is of course not limited to the described or shown embodiments, but generally extends to any embodiment, which falls within the scope of the appended claims as seen in light of the foregoing description and drawings. While a particular feature of the invention may have been described above with respect to only one of the illustrated embodiments, such features may be combined with one or more other features of other embodiments, as may be desired and advantageous for any given particular application. From the above description of the invention, those skilled in the art will perceive improvements, changes and modification. Such improvements, changes and modification within the skill of the art are intended to be covered by the appended claims.

Having described a preferred embodiment of the invention, the following is claimed:

1. A nuclear camera detector comprising:
   an enclosure defining a volume;
   a plurality of solid state detectors arranged in an array, the array within the enclosure volume;

a first cold plate within the enclosure volume and in thermally conductive contact with the plurality of solid state detectors;

a first Peltier cooler within the enclosure volume and in thermally conductive contact with the first cold plate, the first Peltier cooler for cooling the plurality of detectors in the array, a second cold plate within the enclosure volume and thermally insulated from first cold plate;

a second Peltier cooler within the enclosure volume and in thermally conductive contact with the second cold plate, the second Peltier cooler for removing moisture from the enclosure volume; and a heat sink in thermally conductive contact with the first and second Peltier coolers.

2. The nuclear camera detector of claim 1 wherein the second cold plate has capillary bores extending through from a first surface within the enclosure to a second surface.

3. The nuclear camera detector of claim 2 including an insulating member having a first surface in adjacent contact with the second surface of the second cold plate, the insulating member having a second surface at the distil end of the member, the insulating member having capillary bores extending from the first surface through the member to the second surface, the capillary bores corresponding to the capillary bores in the cold plate; and
- a fibrous member in absorptive contact with the second surface of the member, wherein the fibrous member absorbs fluid that is in the capillary bores of the insulating member.

4. The nuclear camera detector of claim 3 comprising a fan operatively controlled and directed to aid evaporation of fluid from the fibrous member by circulating air across the fibrous member.

5. A nuclear camera system comprising:
- a gantry disposed about an examination region;
- at least one detector head mounted to the gantry, the detector head comprising:
- an enclosure defining a volume;
- a plurality of solid state detectors arranged in an array, the array within the enclosure volume;
- a first cold plate within the enclosure and in thermally conductive contact with the plurality of solid state detectors;
- a first Peltier cooler within the enclosure and in thermally conductive contact with the first cold plate, the first Peltier cooler for cooling the plurality of detectors in the array which cooling causes condensation of moisture from adjacent air at the dew point;
- a second cold plate within the enclosure and thermally insulated from first cold plate;
- a second Peltier cooler within the enclosure and in thermally conductive contact with the second cold plate, the second Peltier cooler for removing moisture from air in the enclosure volume; and
- a heat sink in thermally conductive contact with the first and second Peltier coolers;
- a sensor in operative relationship with the detector head, the sensor providing a signal indicative of temperature and moisture within the interior volume of the detector head;
- a controller controllably connected to the sensor, the controller determining a modification to selected environmental conditions within the interior volume of the detector head and providing control instructions; and
- an actuator in operative relationship with the interior volume of the detector and controllably connected to the controller, the actuator implementing a control instruction from the controller for modifying the selected condition within the detector head to the first Peltier cooler to cool the detectors and to the second Peltier cooler to maintain the moisture within the interior volume below a threshold value.

* * * * *